United States Patent Office 3,316,168
Patented Apr. 25, 1967

3,316,168
METHOD OF BLENDING GASOLINE BY CORRELATING THE RATIOS OF VAPOR TO LIQUID VOLUME OVER TEMPERATURE OF INDIVIDUAL COMPONENTS AND THE RESULTANT BLEND
Paul R. Mernitz, Alma, Mich., assignor to Leonard Refineries, Inc., Alma, Mich., a corporation of Michigan
No Drawing. Filed Sept. 11, 1964, Ser. No. 395,908
2 Claims. (Cl. 208—17)

The present invention relates to a method of blending gasoline from a plurality of blending stocks, and more particularly to a method for blending gasoline which utilizes a preselected vapor-to-liquid ratio of the blending stocks in a mathematical expression to predict the temperature at which the blend will attain the preselected vapor-to-liquid ratio.

As is well known, gasoline is blended from a plurality of different blending stocks. The type and amount of blending stocks selected for a given blend is determined by the performance characteristics desired in the ultimate blend and also the availability of the various stocks.

One of the most difficult problems, in the past, has been to provide a gasoline blend having the proper volatility. If the blend is too volatile under the temperature conditions at which the gasoline is to be used, it will cause vapor lock in the vehicle. On the other hand, from the standpoint of utilization of light blending stocks and also the performance characteristics of the blend, it is desired to have the volatility as close as possible to the level of volatility at which vapor lock will occur. Light blending stocks are highly volatile and therefore must be added to the blend with care. From the economic standpoint, it is desired to use the light blending stocks in as large quantities as possible because these stocks are available in large quantities and unless utilized in a gasoline blend must be disposed of at prices well below gasoline prices. Additionally, light blending stocks contribute to gasoline performance in that they are easily atomized, thus improving carburetion which results in quick starts for the vehicle and superior combustion in the engine cylinders.

In the past, gasoline blending techniques involving the use of Reid Vapor Pressure with a function of the Engler distillation curve have been used to predict volatility. Such methods are not entirely accurate and have required the blender to specify a blend on the conservative side in order to avoid the possibility of vapor lock. As above discussed, this is undesirable both from the standpoint of cost and operating characteristics of the blend.

The present invention provides a method for blending gasoline which is accurate and permits close control of gasoline blends without danger of marketing a gasoline which is unsatisfactory.

It is therefore an object of the present invention to provide a method of blending gasoline from a plurality of blending stocks to insure that the resultant blend will have a preselected vapor-to-liquid ratio at a given temperature.

Another object of the invention is to provide a single mathematical expression by means of which the temperature at which a preselected vapor-to-liquid ratio of a gasoline blend will occur can be accurately predicted.

A further object is to provide such a mathematical expression which is of use within the range of vapor-to-liquid ratios which is of practical benefit to provide the vapor lock protection desired.

Another object of the invention is to provide such a single mathematical expression by means of which the temperature of any single preselected vapor-to-liquid ratio of a gasoline blend can be accurately predicted, such expression being mathematically suitable for insertion into a linear program optimization by means of an electronic or other type of computer, thereto act as a single and sufficient restraining function on the preselected vapor-to-liquid ratio of the optimized blend which it is the object of the computer program to predict.

A still further object of the invention is to provide a method for blending gasoline which permits the incorporation in the blend of light blending stocks in larger amounts than have been used in the past without danger of producnig a gasoline blend which will cause vapor lock in vehicles.

A further object of the invention is to provide a gasoline blending technique which will predict a number of different suitable blends each having a different specification and each incorporating a different amount of the various blending stocks, thus permitting the manufacturer to use his supply of blending stocks in the most profitable way.

Other objects of this invention will appear in the following description and appended claims.

Before explaining the present invention in detail, it is to be understood that the invention is not limited in its application to the details described, because the invention is capable of other embodiments and of being practiced or carried out in various ways. Also, it is to be understood that the phraseology or terminology employed herein is for the purpose of description and not of limitatin.

It has been found in the past that the vapor locking tendency of gasoline blends bears a direct relation to the vapor-to-liquid ratio of the gasoline at a given temperature. The blending stocks of which gasoline is composed are in themselves mixtures of various different hydrocarbon compositions and the stocks consequently have a range of vapor-to-liquid ratios because of the different boiling points of the components. As is well known, if such a liquid mixture is confined in a container, a portion of the liquid at any given temperature will pass from the liquid stage to the vapor stage until a point of equilibrium is reached. The proportion of vapor will increase with an increase in temperature.

One satisfactory method of determining the vapor-to-liquid ratio is disclosed in my copending United States patent application, Ser. No. 395,657, filed Sept. 11, 1964. Briefly, this method comprises injecting a known amount of liquid into a buret at a temperature low enough to avoid significant evaporation, commonly 32° F. The buret is graduated to indicate the volume of vapor. Heating means are provided to gradually raise the temperature of the contents of the buret. Temperature readings are taken at different vapor-to-liquid ratios. For example, readings may be taken at vapor-to-liquid ratios of 15 to 1, 20 to 1 and 25 to 1. The buret is agitated to constantly maintain a condition of equilibrium between vapor and liquid phases. The agitation is stopped for a short period of time when the readings are taken. Readings may, optionally, also be taken on a cooling cycle.

A vapor-to-liquid ratio of 20 to 1 has in practice been adopted as one optimum ratio for a gasoline blend at any given temperature. Several vapor-to-liquid ratios may be considered by various gasoline blenders to be optimum for various practical purposes. For instance, as above discussed, a vapor-to-liquid ratio of 20 to 1 may be considered optimum for control of the conditions which may lead to vapor lock at a vehicle's gasoline fuel pump. On the other hand, a vapor-to-liquid ratio of 4 to 1 may be considered optimum for control of condition which may lead to vapor lock of a vendor's gasoline pump employed for dispensing gasoline from a bulk tank installation.

As will be appreciated, the volatility of a gasoline blend must be reduced during the hot summer months and may be increased during the colder winter months. Thus, if it is predicted that during the months of July and August, the temperature for a given area will be about 90° F. then the gasoline blend must have a vapor-to-liquid ratio which will not result in vapor lock at ambient seasonal temperatures of up to 90° F. In practice, this means that a lesser amount of light stocks may be used the temperature will be about 40° F. during January and in the blend. On the other hand, if it is predicted that February, the gasoline blend may be more volatile, permitting the use of a larger amount of light stocks.

While it is true that the temperature at which the preselected liquid-to-vapor ratio is attained is to be compared to and limited by the highest expected seasonal ambient temperature, others have found that there will be a higher temperature than ambient prevailing at the location of the fuel pump of a vehicle. This higher temperature will always be incrementally greater than the expected ambient temperature because of the heating experienced by the critical gasoline handling system in its positional relation to heat radiating engine parts. In the present instance, an increment of 37° F. has been used. A user of the present invention must preselect that increment temperature rise above seasonal ambient levels on the basis of his own experience or information generally available and disclosed elsewhere.

I have evolved the following mathematical expression for utilizing the temperature at which different blending stocks attain a preselected vapor-to-liquid ratio to determine the temperature at which a blend of preselected proportions of the blending stocks will attain the preselected vapor-to-liquid ratio. The formula is as follows:

$$\frac{V_1}{\sqrt{T_1-C}} + \frac{V_2}{\sqrt{T_2-C}} + \frac{V_3}{\sqrt{T_3-C}} + \cdots \frac{V_n}{\sqrt{T_n-C}} = \frac{1}{\sqrt{T_B-C}}$$

Where:

$V_1, V_2, V_3, V_n$ are the respective percents by volume of the blending stocks $T_1, T_2, T_3, T_n$ are the respective temperatures at which the blending stocks attain the preselected vapor-to-liquid ratio C is a preselected base temperature $T_B$ is the temperature at which the blend of the component blending stocks attains the preselected vapor-to-liquid ratio In use of this formula, the proportions of the blending stocks are varied to determine the $T_B$ of different blends. The final blend is selected in accordance with performance and economic considerations. Of course, the final blend must have a $T_B$ equal to or greater than a predetermined value.

It will be noted that a constant "C" is used as a base temperature. Utilizing the Fahrenheit temperature scale, I have found that the base temperature should be 30° F. This value is empirical. It has been found to be the most useful value in the present formula. It may be that there is some connection between the closeness of this temperature and the boiling point at standard conditions of normal butane. Normal butane is of importance because it is commonly the most volatile gasoline blending component used in significant amounts as a gasoline blending stock. However, it is possible that a different temperature base could be used. While I have tried other temperature bases, I have observed that other bases result in a wider divergence from experimental values. This does not, however, rule out the use of some other temperature base. There are some blending stocks which attain a preselected vapor-to-liquid ratio at a temperature equal to or lower than the preselected base temperature of 30° F. For example, although pure normal butane has a boiling point of 31.10° F. butane blending stocks of the type commonly used have boiling ranges below 30° F. It has been found that an effective temperature value may be used for blending stocks which attain the preselected vapor-to-liquid ratio at a temperature below 30° F. In practicable gasolines, such blending stocks are used in relatively minor amounts and do not act in a blend in accordance with their actual vapor-to-liquid characteristics.

The method for determining the effective temperature value for such blending stocks includes first blending a gasoline of all of the proposed blending stocks including the blending stock for which an effective temperature value is to be determined. The temperatures at which the other stocks reach the preselected vapor-to-liquid ratio are known and consequently it is merely necessary to utilize these known values and determine experimentally the value for the entire blend. These values are then inserted in the above formula to determine the effective temperature value for the blending stock in question. This effective value is subsequently used as the value for this blending stock to predict the results of different proportions of the blending stocks in the blend from which the effective value was taken.

For example, the effective temperature for a "butane" of the following composition was determined:

| | Percent |
|---|---|
| Propane | 2 |
| Propylene | 3.7 |
| n-Butane | 80.2 |
| i-Butane | 10.1 |
| i-Pentane | 4.0 |

This butane attained an actual vapor-to-liquid ratio of 15 to 1 at 27° F. and of 37 to 1 at 28° F. These values could not be used in the formula because they result in negative quantities under the radical.

However, when mixed with reformate, the butane was found to have an effective temperature of 42.5° F. at a vapor-to-liquid ratio of 15 to 1 and of 47° F. at a vapor-to-liquid ratio of 25 to 1. These values are usable in the formula. For practical purposes, it has been found that a single effective temperature value may be used for any given "butane" composition regardless of the other components of the blend.

Two typical gasoline blends at which the temperature of the blends at vapor-to-liquid ratios are 15 to 1 and 25 to 1 were predicted in accordance with the present method and then compared with actual experimental values as shown in the following table.

PREDICTIVE AGREEMENT IN FOUR-COMPONENT BLENDS

[Base: 30-day composited wet samples]

| Component | Vol. Percent Composition | °F. Blend Stocks At— | |
|---|---|---|---|
| | | V/L=15 | V/L=25 |
| 1. Spring Season Blend A: | | | |
| Pentanes | 5.8 | 77.5 | 79.3 |
| Light Straight Run | 25.5 | 82 | 84.5 |
| Reformate | 48.7 | 160.5 | 171.5 |
| Raffinate | 20.0 | 159.5 | 163 |

| | °F. Blend, V/L=15 | | | °F. Blend, V/L=25 | | |
|---|---|---|---|---|---|---|
| | Observed | Computed | Dev. | Observed | Computed | Dev. |
| 1. Spring Season Blend A | 121.2 | 122.5 | 1.3 | 127.3 | 128.1 | 0.8 |

| Component | Vol. Percent Composition | °F. Blend Stocks At— | |
|---|---|---|---|
| | | V/L=15 | V/L=25 |
| 2. Early Summer Season Blend B: | | | |
| Pentanes | 6.5 | 89 | 90.5 |
| Light Straight Run | 20.4 | 80 | 84 |
| Reformate | 50.2 | 155 | 167.5 |
| Raffinate | 22.9 | 160 | 162.5 |

| | °F. Blend, V/L=15 | | | °F. Blend, V/L=25 | | |
|---|---|---|---|---|---|---|
| | Observed | Computed | Dev. | Observed | Computed | Dev. |
| 2. Early Summer Season Blend B | 123 | 125.5 | 2.5 | 130 | 132.4 | 2.4 |

As will be noted, the variation between observed and computed values was very slight. This factor can either be ignored or the blend can be corrected to accord with the observed value.

My method is well suited to programming in an electronic computer. By use of a computer, optimum blends fitting different specifications are suggested. These blends are in accordance with the most profitable usage of the supply of blending stocks on hand and with performance characteristics desired in the gasolines. This results in the refiner using his blending stocks to best advantage while still providing gasoline blends which are satisfactory.

My invention may be understood in greater detail by reference to a paper I presented at the National Petroleum Refiners Association, Fuels & Lubricants Meeting, Cleveland, Ohio, on Sept. 18–19, 1963, entitled, "Gasoline Blending Prediction By V/L Characterization of Blend Stocks," and published as Tech. 63–27.

Having thus described my invention, I claim:

1. The method of blending gasoline from a plurality of blending stocks with the use of the following formula:

$$\frac{V_1}{\sqrt{T_1-C}} + \frac{V_2}{\sqrt{T_2-C}} + \frac{V_3}{\sqrt{T_3-C}} + \cdots \frac{V_n}{\sqrt{T_n-C}} = \frac{1}{\sqrt{T_B-C}}$$

Where:

$V_1, V_2, V_3, V_n$ are the respective percents by volume of the blending stocks $T_1, T_2, T_3, T_n$ are the respective temperatures at which the blending stocks attain a preselected vapor-to-liquid ratio $C$ is a preselected base temperature $T_B$ is the temperature at which the blend of the component blending stocks attains a preselected vapor-to-liquid ratio comprising the steps of heating a quantity of each blending stock in a closed container to determine the temperature at which each stock attains a preselected vapor-to-liquid ratio, then, for blending stocks which attain the preselected vapor-to-liquid ratio at a temperature equal to or lower than the preselected base temperature, determining an effective temperature value therefor by the steps of first blending a gasoline of a plurality of blending stocks including the blending stock for which an effective temperature value is to be determined, then heating a quantity of said blend in a closed container to determine the temperature at which the blend of the component blending stocks attains the preselected vapor-to-liquid ratio, then by use of the above formula, determining the effective temperature value for the blending stock in question, then determining the temperature at which different blends of preselected proportions of the blending stocks attain the preselected vapor-to-liquid ratio in accordance with the above formula, and then blending a gasoline from the blending stocks which most nearly has a composition in accordance with desired performance and desired economic results and which has a $T_B$ equal to or greater than the preselected value.

2. The method of claim 1 and further characterized in that the preselected base temperature is 30° F.

References Cited by the Examiner

UNITED STATES PATENTS 2,190,480   2/1940   Nichols et al. _____ 208—17
3,009,789   11/1961  Jordan et al. _____ 208—17

OTHER REFERENCES

"Chemical Technology of Petroleum," W. A. Gruse and D. R. Stevens, 3rd ed. (1960), pp. 434–438, McGraw-Hill Book Co. Inc., New York.

"Fuels and Lubricants," M. Popovich and C. Hering, 1959, pp. 100–101, John Wiley and Sons, Inc., New York.

DANIEL E. WYMAN, *Primary Examiner.*

P. E. KONOPKA, *Assistant Examiner.*